United States Patent
Han et al.

(10) Patent No.: US 7,593,798 B2
(45) Date of Patent: Sep. 22, 2009

(54) VEHICULAR GUIDANCE SYSTEM HAVING COMPENSATION FOR VARIATIONS IN GROUND ELEVATION

(75) Inventors: Shufeng Han, Johnston, IA (US); John Franklin Reid, Champaign, IL (US); Terence Daniel Pickett, Waukee, IA (US)

(73) Assignee: Deere & Company, Moline, IL (US)

( * ) Notice: Subject to any disclaimer, the term of this patent is extended or adjusted under 35 U.S.C. 154(b) by 336 days.

(21) Appl. No.: 10/696,788

(22) Filed: Oct. 30, 2003

(65) Prior Publication Data

US 2005/0096802 A1    May 5, 2005

(51) Int. Cl.
  *A01D 41/127* (2006.01)
  *G05D 1/10* (2006.01)
  *G01C 21/04* (2006.01)
(52) U.S. Cl. .................................. 701/50; 701/210
(58) Field of Classification Search ............. 701/50, 701/206, 210
  See application file for complete search history.

(56) References Cited

U.S. PATENT DOCUMENTS

| | | | | |
|---|---|---|---|---|
| 2,801,511 A | * | 8/1957 | Vogelaar | 56/209 |
| 4,416,109 A | * | 11/1983 | Slazas | 56/209 |
| 4,707,971 A | * | 11/1987 | Forpahl et al. | 56/6 |
| 5,404,661 A | * | 4/1995 | Sahm et al. | 37/348 |
| 5,415,586 A | * | 5/1995 | Hanson et al. | 460/8 |
| 5,438,771 A | * | 8/1995 | Sahm et al. | 37/348 |
| 5,467,271 A | * | 11/1995 | Abel et al. | 702/6 |
| 5,471,391 A | * | 11/1995 | Gudat et al. | 701/50 |
| 5,534,875 A | * | 7/1996 | Diefes et al. | 342/357.11 |
| 5,754,846 A | * | 5/1998 | Janse et al. | 707/100 |
| 5,860,480 A | * | 1/1999 | Jayaraman et al. | 172/2 |
| 5,928,309 A | * | 7/1999 | Korver et al. | 701/214 |
| 5,978,723 A | * | 11/1999 | Hale et al. | 701/50 |
| 5,987,371 A | * | 11/1999 | Bailey et al. | 701/50 |
| 5,987,383 A | * | 11/1999 | Keller et al. | 701/213 |
| 6,028,550 A | * | 2/2000 | Froeberg et al. | 342/357.13 |
| 6,052,647 A | * | 4/2000 | Parkinson et al. | 701/215 |
| 6,112,145 A | * | 8/2000 | Zachman | 701/50 |
| 6,182,007 B1 | | 1/2001 | Szczerba | |
| 6,199,000 B1 | * | 3/2001 | Keller et al. | 701/50 |
| 6,236,916 B1 | * | 5/2001 | Staub et al. | 701/29 |

(Continued)

FOREIGN PATENT DOCUMENTS

DE    195 44 112    11/1995

(Continued)

OTHER PUBLICATIONS

James Stewart. Calculus: Concepts & Contexts 2$^{nd}$ Ed. Thomson Learning © 2001 pp. 798-808.*

(Continued)

*Primary Examiner*—Eric Bolda
*Assistant Examiner*—Ari M Diacou

(57) ABSTRACT

A system and method of guiding a vehicle comprises establishing elevation data and corresponding location data for a work area. A particular location of a vehicle within the work area is determined. Roll data and pitch data are estimated corresponding to the particular location. The vehicle is guided based upon the estimated roll data and the pitch data such that the vehicle follows a desired path.

15 Claims, 4 Drawing Sheets

U.S. PATENT DOCUMENTS

| | | | |
|---|---|---|---|
| 6,275,758 B1* | 8/2001 | Phelps | 701/50 |
| 6,286,606 B1* | 9/2001 | Krieg et al. | 172/4.5 |
| H001997 H * | 10/2001 | Fleischer | 702/5 |
| 6,336,051 B1* | 1/2002 | Pangels et al. | 700/50 |
| 6,345,231 B2* | 2/2002 | Quincke | 701/213 |
| 6,360,169 B1* | 3/2002 | Dudaney | 701/213 |
| 6,445,983 B1* | 9/2002 | Dickson et al. | 701/23 |
| 6,463,374 B1* | 10/2002 | Keller et al. | 701/50 |
| 6,553,299 B1 | 4/2003 | Keller et al. | 701/50 |
| 6,606,542 B2 | 8/2003 | Hauwiller et al. | 700/283 |
| 6,711,838 B2* | 3/2004 | Staub et al. | 37/348 |
| 7,277,837 B2* | 10/2007 | Minton, Jr. | 703/6 |
| 2001/0029417 A1* | 10/2001 | Phelps | 701/50 |
| 2002/0022924 A1* | 2/2002 | Begin | 701/207 |
| 2003/0182025 A1* | 9/2003 | Tseng et al. | 701/1 |
| 2003/0187560 A1* | 10/2003 | Keller et al. | 701/50 |
| 2004/0068352 A1* | 4/2004 | Anderson | 701/25 |
| 2004/0102900 A1* | 5/2004 | Ibrahim et al. | 701/215 |
| 2005/0049802 A1* | 3/2005 | Minton | 702/45 |
| 2005/0102072 A1* | 5/2005 | Deakin | 701/21 |
| 2005/0197755 A1* | 9/2005 | Knowlton et al. | 701/50 |
| 2006/0100775 A1* | 5/2006 | Michi et al. | 701/200 |
| 2007/0271013 A1* | 11/2007 | Jochem et al. | 701/28 |

FOREIGN PATENT DOCUMENTS

| | | |
|---|---|---|
| WO | WO 00/24239 | 5/2000 |

OTHER PUBLICATIONS

James Stewart. Calculus: Concepts & Contexts 2nd Ed. Thomson Learning © 2001 pp. 798-808.*

* cited by examiner

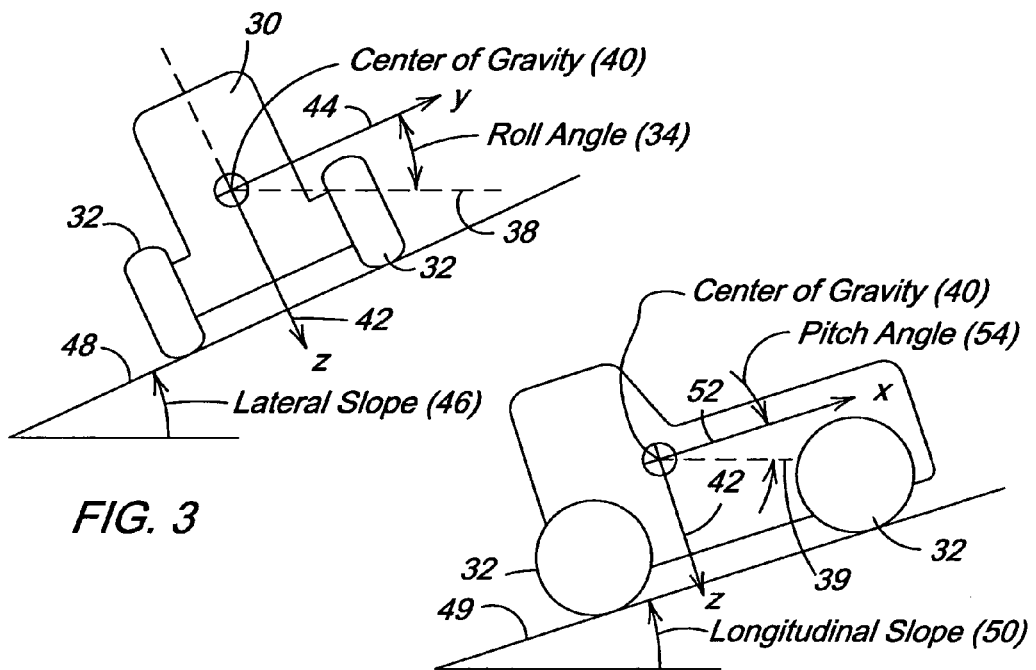
FIG. 3
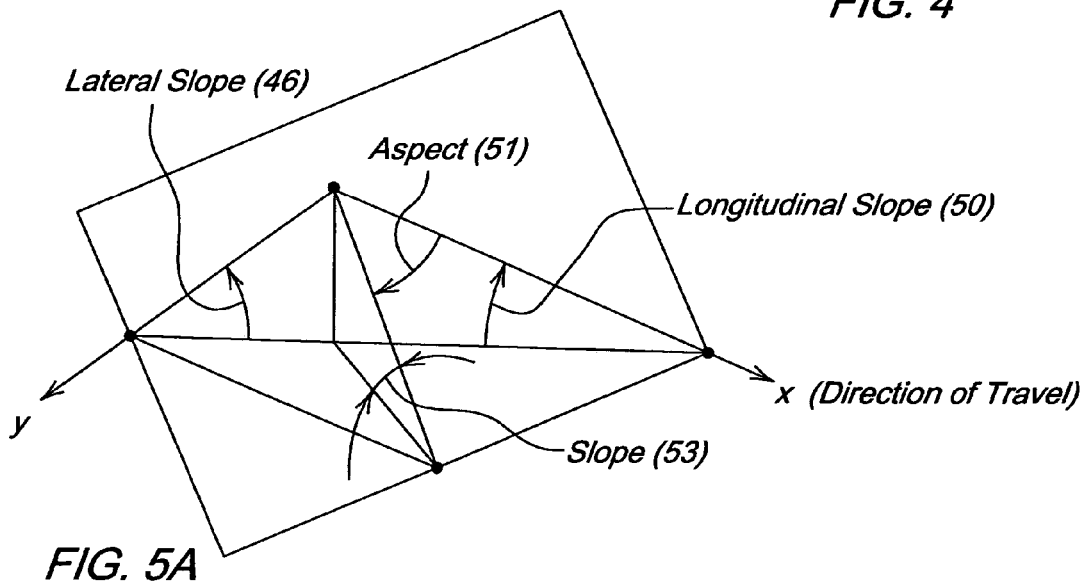
FIG. 4
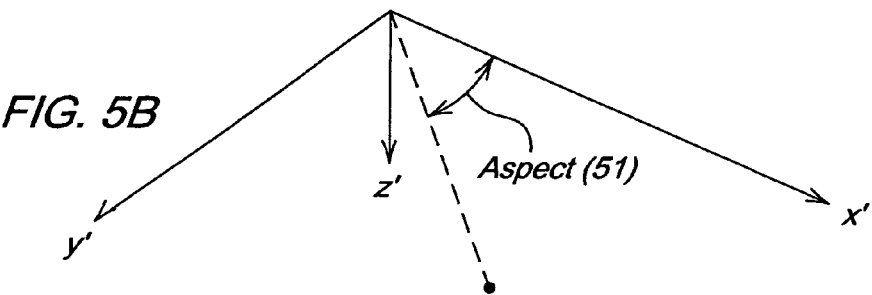
FIG. 5A
FIG. 5B

FIG. 6

| E 1,1 <br> L 1,1 | E 1,2 <br> L 1,2 | E 1,3 <br> L 1,3 | E 1,4 <br> L 1,4 | E 1,5 <br> L 1,5 |
|---|---|---|---|---|
| E 2,1 <br> L 2,1 | E 2,2 <br> L 2,2 | E 2,3 <br> L 2,3 | E 2,4 <br> L 2,4 | E 2,5 <br> L 2,5 |
| E 3,1 <br> L 3,1 | E 3,2 <br> L 3,2 | E 3,3 <br> L 3,3 | E 3,4 <br> L 3,4 | E 3,5 <br> L 3,5 |
| E 4,1 <br> L 4,1 | E 4,2 <br> L 4,2 | E 4,3 <br> L 4,3 | E 4,4 <br> L 4,4 | E 4,5 <br> L 4,5 |
| E 5,1 <br> L 5,1 | E 5,2 <br> L 5,2 | E 5,3 <br> L 5,3 | E 5,4 <br> L 5,4 | E 5,5 <br> L 5,5 |

*Elevation Data (E) vs. Location Data (L)*

FIG. 7

| E 1,1 <br> L 1,1 <br> S 1,1 <br> A 1,1 | E 1,2 <br> L 1,2 <br> S 1,2 <br> A 1,2 | E 1,3 <br> L 1,3 <br> S 1,3 <br> A 1,3 | E 1,4 <br> L 1,4 <br> S 1,4 <br> A 1,4 | E 1,5 <br> L 1,5 <br> S 1,5 <br> A 1,5 | E 1,6 <br> L 1,6 <br> S 1,6 <br> A 1,6 |
|---|---|---|---|---|---|
| E 2,1 <br> L 2,1 <br> S 2,1 <br> A 2,1 | E 2,2 <br> L 2,2 <br> S 2,2 <br> A 2,2 | E 2,3 <br> L 2,3 <br> S 2,3 <br> A 2,3 | E 2,4 <br> L 2,4 <br> S 2,4 <br> A 2,4 | E 2,5 <br> L 2,5 <br> S 2,5 <br> A 2,5 | E 2,6 <br> L 2,6 <br> S 2,6 <br> A 2,6 |
| E 3,1 <br> L 3,1 <br> S 3,1 <br> A 3,1 | E 3,2 <br> L 3,2 <br> S 3,2 <br> A 3,2 | E 3,3 <br> L 3,3 <br> S 3,3 <br> A 3,3 | E 3,4 <br> L 3,4 <br> S 3,4 <br> A 3,4 | E 3,5 <br> L 3,5 <br> S 3,5 <br> A 3,5 | E 3,6 <br> L 3,6 <br> S 3,6 <br> A 3,6 |
| E 4,1 <br> L 4,1 <br> S 4,1 <br> A 4,1 | E 4,2 <br> L 4,2 <br> S 4,2 <br> A 4,2 | E 4,3 <br> L 4,3 <br> S 4,3 <br> A 4,3 | E 4,4 <br> L 4,4 <br> S 4,4 <br> A 4,4 | E 4,5 <br> L 4,5 <br> S 4,5 <br> A 4,5 | E 4,6 <br> L 4,6 <br> S 4,6 <br> A 4,6 |

*Elevation Data, Slope Data and Aspect Data vs. Location Data*

VEHICULAR GUIDANCE SYSTEM HAVING COMPENSATION FOR VARIATIONS IN GROUND ELEVATION

FIELD OF THE INVENTION

This invention relates to a vehicular guidance system having compensation for variations in ground elevation.

BACKGROUND OF THE INVENTION

Vehicles refer to agricultural equipment, construction equipment, tractors, harvesters, combines, and other off-road vehicles. A location-determining receiver (e.g., Global Positioning System receiver) is one of the most useful navigation sensors for user-assisted navigation or autonomous operation of vehicles. However, the location-determining receiver alone typically does not provide roll and pitch angular data of the vehicle. In hilly terrain or other work areas that are not generally flat, the absence of roll and pitch data may contribute to less navigational control of a vehicle than is desired or necessary to follow a generally linear path or another path to a target degree of precision.

To overcome the limitations of the location-determining receiver, additional sensors, such as fiber-optic gyros and accelerometers, may be associated with the location-determining receiver to determine roll and pitch data for the vehicle during its operation. The additional sensors and data processing for processing the sensed data tends to add additional cost to the vehicle. Further, the additional sensors are generally capable of measuring the current posture (e.g., current roll and pitch) of the vehicle, but not predicting the anticipated posture (e.g., future roll and pitch) of the vehicle. Because of the time delay between sensing of the roll and pitch data and acting upon the sensed data, the additional sensors may not provide a sensible solution for improved navigational control of a vehicle. Therefore, a need exists for a vehicular guidance system having compensation for variations in ground elevation.

SUMMARY OF THE INVENTION

A system and method of guiding a vehicle comprises establishing elevation data and corresponding location data for a work area. A particular location of a vehicle within the work area is determined. At least one of roll data and pitch data is estimated corresponding to the particular location based on the established elevation data. The vehicle is guided based upon the estimated roll data, the estimated pitch data, or both such that the vehicle follows a desired path.

BRIEF DESCRIPTION OF THE DRAWINGS

FIG. 3 is a diagram that illustrates a roll angle of a vehicle.

FIG. 4 is a diagram that illustrates a pitch angle of a vehicle.

FIG. 5A and FIG. 5B illustrates lateral slope, longitudinal slope, and aspect angle of a work area.

FIG. 6 illustrates elevation data versus location data on a cellular basis for a work area.

FIG. 7 illustrates elevation data, slope data, and aspect data versus location data on a cellular basis for a work area.

DESCRIPTION OF THE PREFERRED EMBODIMENT

Figure 1:
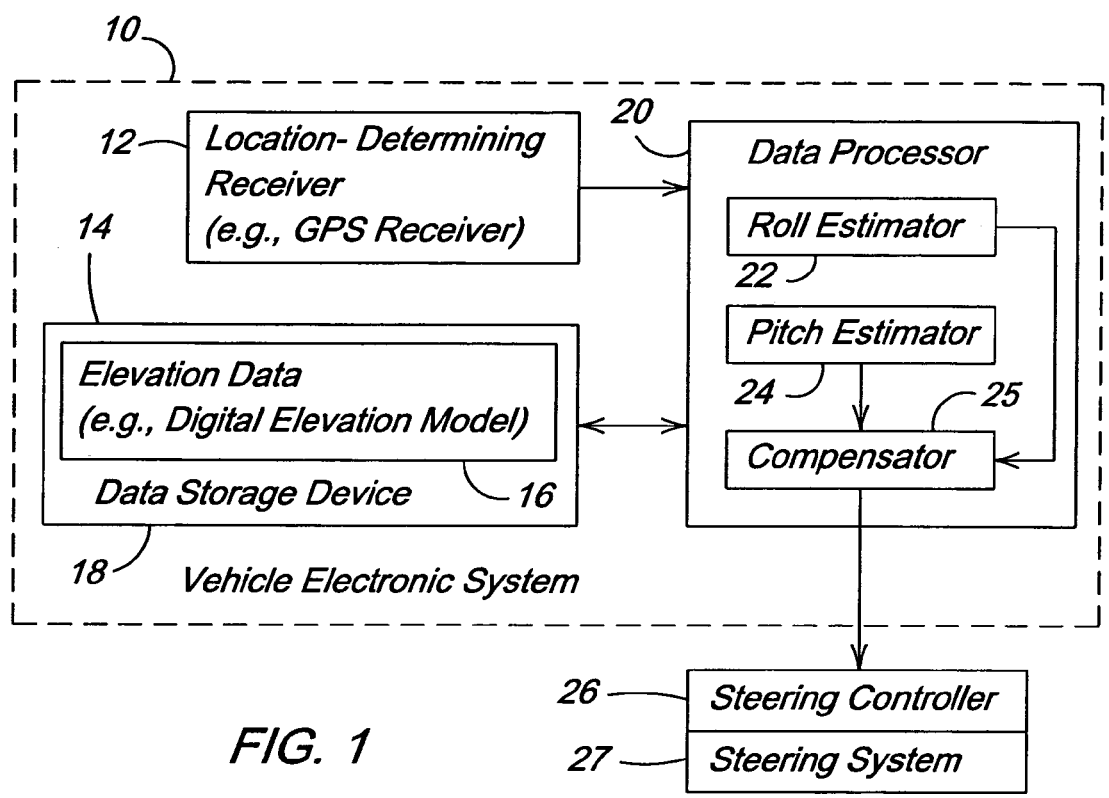
FIG. 1 is a block diagram of vehicular guidance system in accordance with the invention.

In FIG. 1, the vehicle electronic system 10 comprises a location-determining receiver 12 and a data storage device 18 coupled to a data processor 20. In turn, the data processor 20 is coupled to a steering controller 26. The steering controller 26 is associated with a steering system 27 of the vehicle.

The location-determining receiver 12 may comprise a Global Positioning System (GPS) receiver, a Loran receiver, a Loran C receiver or some other navigational receiver to provide geographic coordinates of the receiver 12 or the vehicle on which it is mounted.

The data storage device 18 may store elevation data versus location data (e.g., a digital elevation model) of a work area. In one embodiment, the digital elevation model may divide the work area into a matrix of cells. The cells may be of uniform size and shape, for example. Each cell may be associated with location data and elevation data 16. The location data for a cell may be expressed as geographic coordinates or positional coordinates associated with a central point within the cell or a boundary of a cell.

The topography of the work area may be surveyed by the vehicle or other equipment prior to completing a planned path or a task associated with the work area. The survey or another technique establishes location data versus elevation on a per cell basis over the work area. The location data versus elevation data 16 may be expressed as a digital elevation model, a database file, a look-up table or another representation.

The data processor 20 may comprise a roll estimator 22, a pitch estimator 24, and a compensator 25. The roll estimator 22 estimates roll data for the vehicle based on one or more of the following: location data, elevation data 16, a current position of the vehicle, an expected position of the vehicle, vehicle speed, vehicle heading, vehicular velocity, the interaction between vehicle and ground, and a path plan. The pitch estimator 24 estimates pitch data for the vehicle based on one or more of the following: location data, elevation data 16, a current position of the vehicle, an expected position of the vehicle, vehicle speed, vehicle heading, vehicular velocity, the interaction between vehicle and ground, and a path plan.

The compensator 25 compensates for variation in the roll and pitch data of the vehicle because of local or global changes in the terrain or topography of the work area. In one embodiment, the compensator 25 accepts raw path data for the vehicle and outputs a compensated path plan for the vehicle that considers at least one of the current pitch data, the current roll data, the expected pitch data, and the expected roll data of the vehicle. The raw path plan represents positions and headings for the vehicle, assuming generally flat or ideal terrain, whereas the compensated path plan represents positions and headings of the vehicle that compensate for actual terrain with hills, undulations or other variations in slope or elevation of the ground. The compensator 25 sends the compensated path plan or compensation data (associated therewith) to the steering controller 26 to steer the vehicle along a desired path or route. A steering controller 26 controls the steering and the heading of a vehicle (e.g., the heading along a planned path) via the steering system 27 based on a path plan and compensation data.

The steering controller 26 interfaces the vehicle electronics system 10 with the steering system 27. The steering system 27 may comprise a hydraulic steering system, a hydraulically assisted steering system, an electrical steering system, a mechanical steering system or a gear-driven steering system, or the like associated with the vehicle. A hydraulically-assisted steering system or electrical steering system may be configured to support a mechanical steering system, a gear-driven steering system or a rack-and-pinion steering system, for example. Hydraulic steering systems and hydraulic assisted steering systems may have electromechanical actuators for actuating valves or otherwise controlling the hydraulic aspect of the steering system 27. Electrical steering systems may use electrical motors (directly or indirectly through linkages) to change the orientation of one or more wheels that engage the ground. Compensation data or corresponding corrective signals may be sent to a steering motor driver or another steering controller 26, for example.

Figure 2:
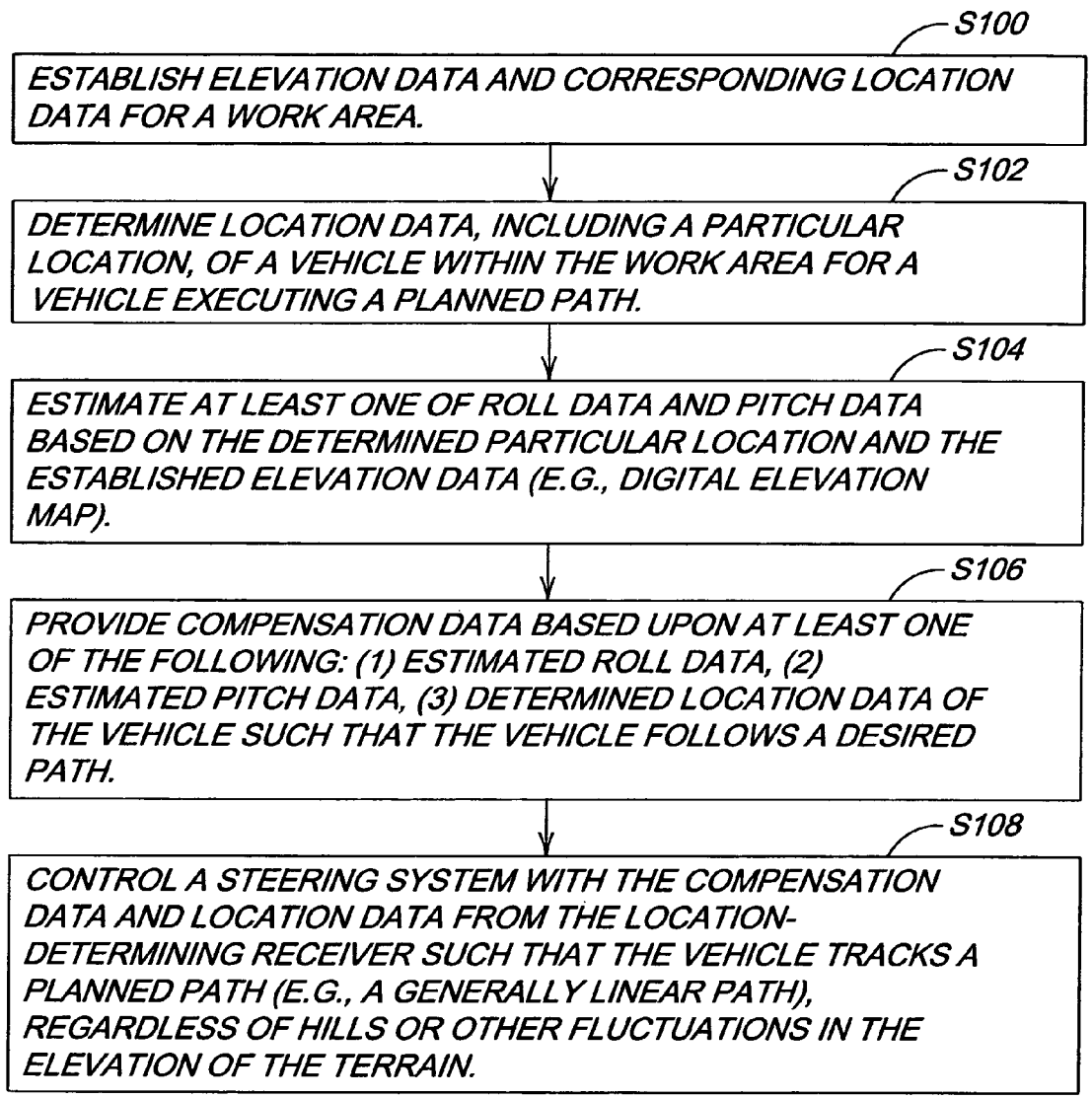
FIG. 2 is a flow chart of a method for guiding a vehicle.

FIG. 2 represents a flow chart of a method for guiding a vehicle having enhanced compensation for variations in ground elevation. The method of FIG. 2 begins in step S100.

In step S100, elevation data and corresponding location data for a work area are established. The work area may be divided into a group of cells of generally uniform size and shape. For example, the work area may be divided into a matrix of generally rectangular cells. Each cell is associated with cellular location data and cellular elevation data. For example, the cellular location data may represent geographic coordinates that define a cell boundary and the cellular elevation data may represent the elevation, slope or other attributes of ground.

Slope data versus location data and/or elevation data versus location data is sampled over the work area and preferably within each cell. A digital elevation map may be created based on an aggregate assembly of the cellular elevation data and corresponding cellular location data. FIG. 6 and FIG. 7 represent illustrative examples of digital elevations maps that could potentially be constructed pursuant to step S100.

In step S102, a location-determining receiver 12 determines location data, including a particular location of a vehicle at a corresponding time within the work area. The particular location may comprise one or more of the following: (1) a current location of the vehicle, (2) a planned location of the vehicle, and (3) a path plan interconnecting the current location and the planned location of the vehicle.

In step S104, an estimator estimates at least one of roll data and pitch data based on the determined particular location and the established elevation data (e.g., digital elevation map). For example, the roll estimator 22 may estimate roll data for the vehicle associated with corresponding location data or position data for a path. Similarly, the pitch estimator 24 may estimate pitch data for the vehicle associated with corresponding location data or position data. Step S104 may involve one or more of the following steps: First, the location-data is used to reference appropriate corresponding established elevation data. Second, the roll data, pitch data, or both is/are referenced from the established elevation data.

The determination of roll data or pitch data from the established elevation data may be accomplished in accordance with various alternate equations or formulae. In one example, the following equations are used to determine pitch and roll angles:

$$\Phi(\text{Roll angle}) = \Theta_y = \arcsin(\sin\Theta \cos\Psi), \text{ and}$$

$$\theta(\text{Pitch angle}) = \Theta_x = \arcsin(\sin\Theta \sin\Psi), \text{ where } \psi \text{ is the aspect, } \Theta \text{ is the slope, } \Theta_x \text{ is the longitudinal slope angle, } \Theta_y \text{ is the lateral slope angle, and the direction of travel of the vehicle is coincident with the x axis.}$$

$$\sin\Theta_x = \sin\Theta \cos\Psi$$

$$\sin\Theta_y = \sin\Theta \sin\Psi, \text{ where } \psi \text{ is the aspect, } \Theta \text{ is the slope, } \Theta_x \text{ is the longitudinal slope angle and } \Theta_y \text{ is the lateral slope angle,}$$

The above equations are based on geometry of the vehicle and the topography of the land. The roll estimator 22 may determine the roll angle for the cells along a planed path or raw path, whereas the pitch estimator 24 may determine the pitch angle for the cells along the planned path or raw path.

In another example, static force balance equations, dynamic force equations, or both, may be used to supplement or replace the above equations for determining pitch and roll angles. The static force balance equations and the dynamic force balancing equations may consider one or more of the following variables: vehicle geometry (size), tire geometry, vehicle weight and load, vehicle wheelbase and spacing, forces acting on the tires of the vehicle, and velocities and accelerations of the vehicle and their components.

In step S106, the compensator 25 provides compensation data based upon at least one of the following: (1) estimated roll data, (2) estimated pitch data, (3) planned path of the vehicle, (4) position of the vehicle, (5) speed of the vehicle, (6) velocity (i.e., speed and heading) of the vehicle, (7) acceleration or deceleration of the vehicle such that the vehicle follows a desired path. The estimated roll data, the estimated pitch data, or both is/are used to generate a compensation data or another corrective input for a steering controller 26. It is anticipated that compensation data with any cell may depend upon (a) the direction on entry and location of entry of the vehicle into the cell, (b) the direction of exit and location of exit out of a cell, and (c) vehicular velocity and (d) an overall planned path of the vehicle.

In step S108, the steering controller 26 controls steering system 27 with the compensation data from the compensator and location data from the location-determining receiver such that the vehicle tracks a planned path (e.g., a generally linear path), regardless of hills or other fluctuations in the elevation of the terrain. The compensation data may reduce the jitter, sway or other undesired deviation in position in the actual path of the vehicle from the target path that might otherwise occur. The compensation data represent a compensation to compensate for the difference between an actual location-based guidance path and a target planned path (e.g., a generally linear path).

FIG. 3 illustrates a rear view of a vehicle 30 having tires 32 that rest on the laterally sloped ground 48. The roll angle 34 ($\Phi$) is defined with reference to the center of gravity 40 of the vehicle 30. The vertex of the roll angle 34 is coextensive with the center of gravity 40 of the vehicle 30. One first side 44 (indicated by dashed lines) of the roll angle 34 is generally parallel to unsloped or level ground, whereas the other side (indicated by the y direction arrow) of the roll angle 34 is generally parallel to the lateral slope 46 of sloped ground. The z axis 42 represents a normal force of the vehicle 30 on the sloped ground 48.

FIG. 4 illustrates a side view of the vehicle 30 having tires 32 that rest on the longitudinally sloped ground 49. The pitch angle 54 ($\psi$) is defined with reference to the center of gravity 40 of the vehicle 30. The vertex of the pitch angle is coextensive with the center of gravity 40 of the vehicle 30. One side 39 of the pitch angle is generally parallel to unsloped or level ground, whereas the other side 52 of the pitch angle is generally parallel to the longitudinal slope of sloped ground. The z axis 42 represents a normal force of the vehicle 30 on the ground sloped ground 48.

FIG. 5A illustrates the slope of the terrain of at least a portion (e.g., a cell) of the work area. The slope $\Theta$ comprises a lateral slope 46 ($\Theta_y$) and a longitudinal slope 50 ($\Theta_x$). FIG.

5A and FIG. 5B illustrate an aspect which represents the direction of the maximum slope. In one embodiment, each cell may be defined by a slope ($\Theta$), which comprises the following components: a longitudinal slope ($\Theta_x$) and a lateral slope 46 ($\Theta_y$). The aspect 51 or aspect angle ($\psi$) is the direction of the maximum slope, referenced from the x axis. The aspect angle is the angle between the x axis and the maximum slope. The direction of travel may be defined coincident with the x axis. The slope relationship is defined as follows:

$$\sin \Theta_x = \sin \Theta \cos \Psi$$

$\sin \Theta_y = \sin \Theta \sin \Psi$, where $\psi$ is the aspect and $\Theta$ is the slope, $\Theta_x$ is the longitudinal slope, band $\Theta_y$ is the lateral slope 46.

The roll and the pitch data for each cell or another portion of the work area may be estimated by the application of the following equations:

$$\Phi(\text{Roll angle}) = \Theta_y = \arcsin(\sin \Theta \cos \Psi), \text{ and}$$

$\theta(\text{Pitch angle}) = \Theta_x = \arcsin(\sin \Theta \sin \Psi)$, where $\psi$ is the aspect, $\Theta$ is the slope, $\Theta_x$ is the longitudinal slope angle, and $\Theta_y$ is the lateral slope 46.

In practice, the above equations may be modified or accompanied by static force balance equations and dynamic equations with respect to the vehicle 30 operating in the work area. The static force balance and dynamic equations may include one or more of the following variables: (a) vehicular geometry and dimensions, (b) vehicular weight and load, (c) forces acting on the tires 32, (d) velocities and accelerations, and (e) other vehicular attributes or specifications.

FIG. 6 illustrates a first digital elevation model map in graphical form. It is understood that any digital evaluation model map may be stored as a table, a database or an inverted file. The digital elevation model divides a work area into uniform-shaped cells (e.g., rectangles or squares). A uniform value for elevation and slope may be assumed within any single cell. The cell size may depend upon the availability of topographical data for the work area. A cell size that is less than or equal to the vehicle length is preferable to obtaining a sufficiently accurate estimate of pitch data and roll data. The first digital elevation map of FIG. 6 divides the work area into a five by five area of rectangular cells, wherein each cell has elevation data (E) and location data (L). For example, the cell identifier of row 1, column 1, is associated with E1,1 and L1,1; the cell identifier of row 2, column 2 is associated with E2,2 and L2,2; the cell identifier of row 3, column 3 is associated with E3,3 and L3,3; the cell identifier of row 4, column 4 is associated with E4,4, and L4,4; and cell identifier of row 5, column 5 is associated with E5,5 and L5,5.

FIG. 7 illustrates a second digital elevation model map in graphical form. The second digital elevation map of FIG. 7 divides the work area into a four by six area of generally rectangular cells. Each cell within the second digital elevation model map may be assigned or associated with a corresponding uniform elevation data (E), slope data (S), aspect data (A), and location data (L). For example, the cell identifier of row 1, column 1, is associated with E1,1, L1,1, S1,1, and A1,1; the cell identifier of row 2, column 2 is associated with E2,2, L2,2, S2,2, and A2,2; the cell identifier of row 3, column 3 is associated with E3,3, L3,3, S3,3, and A3,3; the cell identifier of row 4, column 4 is associated with E4,4, L4,4, S4,4, and A4,4; the cell identifier of row 1, column 6 is associated with E1,6, L1,6, S1,6, and A1,6; and the cell identifier row 4, column 6 is associated with E4,6, L4,6, S4,6, and A4,6. FIG. 6 and FIG. 7 are illustrative examples of representations of a digital elevation model; actual representations may vary in their size, shape, the number of cells, number of variables per cell, and still fall within the scope of the claimed invention.

Having described the preferred embodiment, it will become apparent that various modifications can be made without departing from the scope of the invention as defined in the accompanying claims.

What is claimed is:

1. A method of guiding a vehicle, the method comprising:
   establishing elevation data and corresponding location data for a work area divided into cells;
   determining location data, including a particular location of a vehicle, within the work area;
   estimating at least one of roll data and pitch data corresponding to the particular location, the roll data associated with a corresponding lateral slope, the pitch data associated with a corresponding longitudinal slope generally perpendicular to the lateral slope, wherein each of the roll data and pitch data are separately estimated using i) a maximum slope of ground with respect to a reference point for each cell traversed by the vehicle corresponding to the particular location, and the maximum slope having a non-zero longitudinal slope component and a non-zero lateral slope component, and ii) an aspect angle between a direction of the maximum slope and an axis with which a direction of travel is coincident;
   guiding the vehicle steering in a direction of travel with compensation data based upon at least one of the estimated roll data and the pitch data such that an actual path of the vehicle follows a target path.

2. The method according to claim 1 wherein the roll data comprises a roll angle and wherein the pitch data comprises a pitch angle.

3. The method according to claim 1 wherein each cell is associated with a corresponding elevation data and respective location data.

4. The method according to claim 1 further comprising establishing respective slope data and aspect data associated with the location data, the slope data indicating a change in elevation of terrain in the work area and the aspect data indicating the direction of slope.

5. The method according to claim 1 wherein the target path comprises a substantially linear or arc path segment.

6. The method according to claim 1 wherein the guidance comprises generating a steering compensation data to compensate for changes in the roll data and pitch data between an uncorrected vehicular path and the target path.

7. The method according to claim 1 wherein the estimating comprises estimating the pitch data based on one or more of the following: location data, elevation data, a current position of the vehicle, an expected position of the vehicle, vehicle speed, vehicle heading, vehicular velocity, and a path plan.

8. The method according to claim 1 wherein the estimating comprises estimating the pitch data consistent with the following equation:

$\theta(\text{Pitch angle}) = \Theta_x = \arcsin(\sin \Theta \sin \Psi)$, where $\Psi$ is the aspect, $\Theta$ is the slope, and $\Theta_x$ is the longitudinal slope angle.

9. The method according to claim 1 wherein the estimating comprises estimating the roll data based on one or more of the following: location data, elevation data, a current position of the vehicle, an expected position of the vehicle, vehicle speed, vehicle heading, vehicular velocity, and a path plan.

10. The method according to claim 1 wherein the estimating comprises estimating the roll data consistent with the following equation:

$\Phi(\text{Roll angle}) = \Theta_y = \arcsin(\sin \Theta \cos \Psi)$, where $\Psi$ is the aspect, $\Theta$ is the slope, and $\Theta_y$ is the lateral slope.

11. The method according to claim 1 wherein the aspect represents a radial direction of maximum slope.

12. The method according to claim 8 wherein the equation is supplemented by at least one of a static force balance equation and a dynamic force equation considering one or more of the following variables: vehicle geometry, vehicle size, tire geometry, vehicle weight and load, vehicle wheelbase and spacing, forces acting on the tires of the vehicle, and velocities and accelerations of the vehicle and their components.

13. The method according to claim 10 wherein the foregoing equation is supplemented by at least one of a static force balance equation and a dynamic force equation considering one or more the following variables: vehicle geometry, vehicle size, tire geometry, vehicle weight and load, vehicle wheelbase and spacing, forces acting on the tires of the vehicle, and velocities and accelerations of the vehicle and their components.

14. The method of claim 1 wherein a size of each of the cells is less than or equal to a length of the vehicle.

15. The method of claim 1 wherein the particular location of the vehicle is at least one of a current location of the vehicle, a planned location of the vehicle, and a path plan interconnecting the current location and the planned location of the vehicle.

* * * * *